(12) United States Patent
Carlson et al.

(10) Patent No.: US 8,662,397 B2
(45) Date of Patent: Mar. 4, 2014

(54) MULTIPLE CAMERA IMAGING-BASED BAR CODE READER

(75) Inventors: Bradley S. Carlson, Huntington, NY (US); Eugene Joseph, Coram, NY (US)

(73) Assignee: Symbol Technologies, Inc., Holtsville, NY (US)

( * ) Notice: Subject to any disclaimer, the term of this patent is extended or adjusted under 35 U.S.C. 154(b) by 1544 days.

(21) Appl. No.: 11/862,568

(22) Filed: Sep. 27, 2007

(65) Prior Publication Data

US 2009/0084854 A1 Apr. 2, 2009

(51) Int. Cl.
*G02B 5/00* (2006.01)

(52) U.S. Cl.
USPC ............ 235/462.32; 235/462.01; 235/462.09; 235/462.1; 235/462.11; 235/462.14; 235/462.25

(58) Field of Classification Search
USPC .................. 235/454, 462.01, 462.41, 462.43, 235/462.44
See application file for complete search history.

(56) References Cited

U.S. PATENT DOCUMENTS

| | | |
|---|---|---|
| 3,211,046 A | 10/1965 | Kennedy |
| 3,947,816 A | 3/1976 | Rabedeau |
| 4,613,895 A | 9/1986 | Burkey et al. |
| 4,794,239 A | 12/1988 | Allais |
| 5,058,188 A | 10/1991 | Yoneda |
| 5,059,779 A | 10/1991 | Krichever et al. |
| 5,124,539 A | 6/1992 | Krichever et al. |
| 5,200,599 A | 4/1993 | Krichever et al. |
| 5,304,786 A | 4/1994 | Pavlidis et al. |
| 5,371,357 A | 12/1994 | Robertson |
| 5,559,562 A | 9/1996 | Ferster |
| 5,608,639 A | 3/1997 | Twardowski et al. |
| 5,703,349 A | 12/1997 | Meyerson et al. |
| 5,705,802 A | 1/1998 | Bobba et al. |
| 5,717,195 A | 2/1998 | Feng et al. |
| 5,801,370 A | 9/1998 | Katoh et al. |
| 5,936,218 A | 8/1999 | Ohkawa et al. |
| 5,987,428 A | 11/1999 | Walter |

(Continued)

FOREIGN PATENT DOCUMENTS

| | | |
|---|---|---|
| EP | 1006475 A2 | 6/2000 |
| EP | 1933254 A1 | 6/2008 |

(Continued)

OTHER PUBLICATIONS

Australian Office Action mailed Nov. 2, 2010, in Australia for related Application No. 2008272946.

(Continued)

*Primary Examiner* — Christopher Stanford
(74) *Attorney, Agent, or Firm* — Nong-Qiang Fan (57) ABSTRACT

A multicamera imaging-based bar code reader for imaging a target bar code on a target object features: a housing supporting a plurality of transparent windows and defining an interior region, a target object being presented to the plurality of windows for imaging a target bar code; an imaging system including a plurality of camera assemblies coupled to an image processing system, each camera assembly of the plurality of camera assemblies being positioned within the housing interior position. Each camera assembly includes a sensor array and an imaging lens assembly for focusing a field of view of the camera assembly onto the sensor array and wherein the sensor array is read out at a predetermined frame rate. The predetermined frame rate of at least one camera assembly is less than the predetermined frame rates of the other camera assemblies.

14 Claims, 5 Drawing Sheets

(56) References Cited

U.S. PATENT DOCUMENTS

| | | | |
|---|---|---|---|
| 6,006,990 | A | 12/1999 | Ye et al. |
| 6,141,062 | A | 10/2000 | Hall et al. |
| 6,330,973 | B1 | 12/2001 | Bridgelall et al. |
| 6,336,587 | B1 | 1/2002 | He et al. |
| 6,340,114 | B1 | 1/2002 | Correa et al. |
| 6,392,688 | B1 | 5/2002 | Barman et al. |
| 6,538,243 | B1 | 3/2003 | Bohn et al. |
| 6,629,642 | B1 | 10/2003 | Swartz et al. |
| 6,899,272 | B2 | 5/2005 | Krichever et al. |
| 6,924,807 | B2 | 8/2005 | Ebihara et al. |
| 6,951,304 | B2 | 10/2005 | Good |
| 6,991,169 | B2 | 1/2006 | Bobba et al. |
| 7,076,097 | B2 | 7/2006 | Kondo et al. |
| 7,116,353 | B2 | 10/2006 | Hobson et al. |
| 7,191,947 | B2 | 3/2007 | Kahn et al. |
| 7,219,831 | B2 | 5/2007 | Murata |
| 7,280,124 | B2 | 10/2007 | Laufer et al. |
| 7,296,744 | B2 | 11/2007 | He et al. |
| 7,416,119 | B1 | 8/2008 | Inderrieden |
| 7,430,682 | B2 | 9/2008 | Carlson et al. |
| 7,475,823 | B2 | 1/2009 | Brock |
| 7,533,819 | B2 | 5/2009 | Barkan et al. |
| 7,543,747 | B2 | 6/2009 | Ehrhart |
| 7,619,527 | B2 | 11/2009 | Friend et al. |
| 7,757,955 | B2 | 7/2010 | Barkan et al. |
| 7,780,086 | B2 * | 8/2010 | Barkan et al. ............ 235/462.32 |
| 8,079,523 | B2 | 12/2011 | Barkan et al. |
| 2001/0042789 | A1 * | 11/2001 | Krichever et al. ........ 235/462.14 |
| 2002/0138374 | A1 | 9/2002 | Jennings et al. |
| 2002/0162887 | A1 | 11/2002 | Detwiler |
| 2003/0029915 | A1 | 2/2003 | Barkan et al. |
| 2003/0078849 | A1 | 4/2003 | Snyder |
| 2003/0082505 | A1 | 5/2003 | Frohlich et al. |
| 2003/0102377 | A1 | 6/2003 | Good |
| 2003/0122093 | A1 | 7/2003 | Schauer |
| 2003/0156303 | A1 * | 8/2003 | Schnee et al. ................ 358/509 |
| 2003/0213841 | A1 | 11/2003 | Josephson et al. |
| 2004/0146211 | A1 | 7/2004 | Knapp et al. |
| 2004/0189472 | A1 | 9/2004 | Acosta et al. |
| 2005/0034036 | A1 | 2/2005 | Lages et al. |
| 2005/0098633 | A1 | 5/2005 | Poloniewicz et al. |
| 2005/0259746 | A1 | 11/2005 | Shinde et al. |
| 2006/0022051 | A1 * | 2/2006 | Patel et al. ............... 235/462.14 |
| 2006/0043193 | A1 | 3/2006 | Brock |
| 2006/0098433 | A1 | 5/2006 | Chaleff et al. |
| 2006/0118628 | A1 | 6/2006 | He et al. |
| 2006/0180670 | A1 | 8/2006 | Acosta et al. |
| 2007/0001013 | A1 | 1/2007 | Check et al. |
| 2007/0079029 | A1 | 4/2007 | Carlson et al. |
| 2008/0011846 | A1 | 1/2008 | Cato |
| 2008/0122969 | A1 | 5/2008 | Alakarhu |
| 2008/0128509 | A1 | 6/2008 | Knowles et al. |
| 2008/0283611 | A1 * | 11/2008 | Knowles et al. ......... 235/462.42 |
| 2008/0296382 | A1 | 12/2008 | Connell, II et al. |
| 2009/0026271 | A1 | 1/2009 | Drzymala et al. |
| 2009/0101719 | A1 | 4/2009 | Knowles et al. |
| 2009/0206161 | A1 | 8/2009 | Olmstead |
| 2009/0272810 | A1 | 11/2009 | Barkan |
| 2010/0102129 | A1 | 4/2010 | Drzymala et al. |
| 2010/0165160 | A1 | 7/2010 | Olmstead et al. |

FOREIGN PATENT DOCUMENTS

| | | | |
|---|---|---|---|
| EP | 1223535 | B1 | 6/2009 |
| WO | 0182214 | A1 | 11/2001 |
| WO | 2009006419 | A1 | 1/2009 |
| WO | 2010053682 | A1 | 5/2010 |

OTHER PUBLICATIONS

Final Office Action mailed Jan. 12, 2012 in U.S. Appl. No. 12/266,642, Edward D. Barkan, filed Nov. 7, 2008.

Final Office Action mailed Jul. 8, 2010 in U.S. Appl. No. 12/266,642, Edward D. Barkan, filed Nov. 7, 2008.

Final Office Action mailed Jun. 11, 2010 in U.S. Appl. No. 12/168,347, Edward Barkan, filed Jul. 7, 2008.

Final Office Action mailed May 23, 2012 in related U.S. Appl. No. 12/241,153, Mark Drzymala, filed Sep. 30, 2008.

Final Office Action mailed Oct. 29, 2012 in U.S. Appl. No. 12/245,111, Mark Drzymala, filed Oct. 3, 2008.

Final Office Action mailed on Apr. 23, 2013 in U.S. Appl. No. 12/260,168, Mark Drzymala, filed on Oct. 29, 2008.

Final Office Action mailed on May 11, 2011 in U.S. Appl. No. 12/260,168, Mark Drzymala, filed on Oct. 29, 2008.

Final Office Action mailed Sep. 12, 2013 in U.S. Appl. No. 12/168,347, Edward Barkan, filed Jul. 7, 2008.

International Preliminary Report on Patentability and Written Opinion for International Application No. PCT/US2009/061838 mailed on May 19, 2011.

International Preliminary Report on Patentability and Written Opinion for International Application No. PCT/US2009/067816 mailed on Jun. 30, 2011.

International Preliminary Report on Patentability and Written Opinion for International Patent application No. PCT/US2009/061218 mailed on May 12, 2011.

International Preliminary Report on Patentability and Written Opinion for International Patent Application No. PCT/US2009/048435 mailed on Jan. 20, 2011.

International Preliminary Report on Patentability and Written Opinion for International Patent Application No. PCT/US2008/068810 mailed on Jan. 14, 2010.

International Search Report and the Written Opinion of the International Searching Authority for International Application No. PCT/US2009/048435, mailed Oct. 21, 2009.

International Search Report and Written Opinion for International Patent Application No. PCT/US2009/061218 mailed on Jan. 25, 2010.

International Search Report and Written Opinion for International Patent Application No. PCT/US2009/061838 mailed Jan. 28, 2010.

International Search Report and Written Opinion for International Patent Application No. PCT/US2009/067816 mailed on Mar. 26, 2010.

International Search Report and Written Opinion for International Application No. PCT/US2008/068810 mailed on Feb. 10. 2008.

Non Final Office Action mailed Jan. 20, 2010 in U.S. Appl. No. 11/823,818, Edward Barkan et al., filed Jun. 28, 2007.

Non Final Office Action mailed Oct. 31, 2011 in U.S. Appl. No. 12/245,111, Mark Drzymala et al., filed Oct. 3, 2008.

Non Final Office Action mailed on May 2, 2011 in U.S. Appl. No. 12/334,830, Edward D. Barkan, filed on Dec. 15, 2008.

Non Final Office Action mailed on Sep. 30, 2010 in U.S. Appl. No. 12/260,168, Mark Drzymala, filed on Oct. 29, 2008.

Non Final Office Action mailed Sep. 7, 2011 in U.S. Appl. No. 12/241,153, Mark Drzymala, filed Sep. 30, 2008.

Non-Final Office Action mailed Jan. 11, 2010 in U.S. Appl. No. 12/266,642, Edward D. Barkan, filed Nov. 7, 2008.

Non-Final Office Action mailed Jan. 31, 2011 in U.S. Appl. No. 12/266,642, Edward D. Barkan, filed Nov. 7, 2008.

Non-Final Office Action mailed Jul. 11, 2011 in U.S. Appl. No. 12/266,642, Edward D. Barkan, filed Nov. 7, 2008.

Non-Final Office Action mailed Mar. 26, 2013 in U.S. Appl. No. 12/168,347, Edward Barkan, filed Jul. 7, 2008.

Non-Final Office Action mailed Oct. 30, 2009 in U.S. Appl. No. 12/168,347, Edward Barkan, filed Jul. 7, 2008.

Non-Final Office Action mailed Oct. 31, 2011 in U.S. Appl. No. 12/245,111, Mark Drzymala, filed Oct. 3, 2008.

Non-Final Office Action mailed Nov. 19, 2012 in U.S. Appl. No. 12/260,168, Mark Drzymala, filed on Oct. 29, 2008.

Notice of Allowance mailed Apr. 19, 2010 in U.S. Appl. No. 12/112,275, Edward D. Barkan, filed Apr. 30, 2008.

Notice of Allowance mailed Jan. 4, 2013 in U.S. Appl. No. 12/245,111, Mark Drzymala, filed Oct. 3, 2008.

Notice of Allowance mailed Jun. 1, 2010, in U.S. Appl. No. 11/823,818, Edward Barkan et al., filed Jun. 28, 2007.

(56) References Cited

OTHER PUBLICATIONS

Notice of Allowance mailed Jun. 17, 2011, in U.S. Appl. No. 12/315,235, James Giebel, filed Dec. 1, 2008.
Notice of Allowance mailed Jun. 30, 2010, in U.S. Appl. No. 11/823,818, Edward Barkan et al., filed Jun. 28, 2007.
Notice of Allowance mailed Mar. 21, 2013 in U.S. Appl. No. 12/245,111, Mark Drzymala, filed Oct. 3, 2008.
Notice of Allowance mailed Mar. 25, 2013 in U.S. Appl. No. 12/266,642, Edward D. Barkan, filed Nov. 7, 2008.
Notice of Allowance mailed Oct. 17, 2011 in U.S. Appl. No. 12/334,830, Edward D. Barkan, filed on Dec. 15, 2008.
Notice of Allowance mailed Sep. 9, 2011 in U.S. Appl. No. 12/315,235, James Giebel, filed Dec. 1, 2008.
US 5,717,196, 02/1998, Feng et al. (withdrawn)

* cited by examiner

MULTIPLE CAMERA IMAGING-BASED BAR CODE READER

FIELD OF THE INVENTION

The present invention relates to a multiple camera or multicamera imaging-based bar code reader and, more particularly, to a multicamera imaging-based bar code reader wherein cameras less likely to be used for imaging a target bar code are operated at a reduced frame rate.

BACKGROUND OF THE INVENTION

Various electro-optical systems have been developed for reading optical indicia, such as bar codes. A bar code is a coded pattern of graphical indicia comprised of a series of bars and spaces of varying widths, the bars and spaces having differing light reflecting characteristics. The pattern of the bars and spaces encode information. Bar code may be one dimensional (e.g., UPC bar code) or two dimensional (e.g., DataMatrix bar code). Systems that read, that is, image and decode bar codes employing imaging camera systems are typically referred to as imaging-based bar code readers or bar code scanners.

Imaging-based bar code readers may be portable or stationary. A portable bar code reader is one that is adapted to be held in a user's hand and moved with respect to a target indicia, such as a target bar code, to be read, that is, imaged and decoded. Stationary bar code readers are mounted in a fixed position, for example, relative to a point-of-sales counter. The bar code reader is installed behind one or more transparent windows in a housing which may be integrated into the counter. Target objects, e.g., a product package that includes a target bar code, are presented to one of the one or more transparent windows and thereby pass within a field of view of the stationary bar code readers. The bar code reader typically provides an audible and/or visual signal to indicate the target bar code has been successfully imaged and decoded.

A typical example where a stationary imaging-based bar code reader would be utilized includes a point of sale counter/cash register where customers pay for their purchases. The reader is typically enclosed in a housing that is integral to the counter and normally includes a vertically oriented transparent window and/or a horizontally oriented transparent window, either of which may be used for reading the target bar code affixed to the target object, i.e., the product or product packaging for the product having the target bar code imprinted or affixed to it. The sales person (or customer in the case of self-service check out) sequentially presents each target object's bar code either to the vertically oriented window or the horizontally oriented window, whichever is more convenient given the specific size and shape of the target object and the position of the bar code on the target object.

A stationary imaging-based bar code reader that comprises a plurality of imaging cameras systems is sometimes referred to as a bioptic or multicamera imaging-based scanner or bar code reader. In a multicamera imaging reader, each camera system typically is positioned behind one of the plurality of transparent windows such that it has a different field of view from every other camera system. While the fields of view may overlap to some degree, the effective or total field of view of the reader is increased by adding additional camera systems. Hence, the desirability of multicamera readers as compared to signal camera readers which have a smaller effective field of view and require presentation of a target bar code to the reader in a very limited orientation to obtain a successful, decodable image, that is, an image of the target bar code that is decodable.

The camera systems of a multicamera imaging reader may be positioned within the housing and with respect to the transparent windows such that when a target object is presented to the housing for reading the target bar code on the target object, the target object is imaged by the plurality of imaging camera systems, each camera providing a different image of the target object. For example, one camera system may be positioned to image a top view of the target object, another camera may image a bottom view of the target object, yet another camera may image a first side of the target object. Depending on the position of the camera systems and the size of the target object being imaged, it is possible for a small target object, e.g., a small six sided box containing a bottle of aspirin, that all six sides of the target object may be imaged. Thus, it is also clear that increasing the number of camera assemblies increases the ability to image a target bar code on a target object and provides greater flexibility as to how the target object may be oriented or presented to the housing or the transparent windows while still achieving at least one decodable image.

One problem with multicamera imaging-based bar code readers is that they require a very high bandwidth interface to the cameras for image acquisition. For example, a six camera imaging system running at 26 MHz (megahertz) requires a throughput of 156 Mbytes/second. This is the equivalent of six cameras running at 60 frames per second each at 752×480 pixel resolution. This throughput of 156 Mbytes/second places tremendous demand on the bus interface of the image processing system.

Another problem facing designers of multicamera imaging readers is the number of electrical connections to the image processing system. A camera requires at minimum two control lines, three synchronization lines, and typically eight data lines for transmitting data bits. Thus, for a six camera system, this can result in up to 13×6=78 electrical connections to the image processing system. The interface between the cameras and the image processing system is typically controlled by an ASIC (application specific integrated circuit). The greater the number of electrical connections to the image processing system, the greater the cost of the ASIC that is used to implement the interface between the cameras and the image processing system.

With the trend of increasing the number of camera assemblies in multicamera imaging bar code reader to increase the effective field of view and ability to image target bar codes regardless of their presentation orientation, the problems of high bandwidth interface and the number of electrical connections to the image processing system will only become more problematic in the future.

What is needed is a multicamera imaging-based bar code reader and a method of operating a multicamera imaging-based bar code reader that reduces the required interface bandwidth of the bus interface of the imaging processing system and/or reduces the number of electrical connections to the image processing system.

SUMMARY OF THE INVENTION

The present invention concerns a multicamera imaging-based bar code reader and a method of operating a multicamera imaging-based bar code reader that reduces required interface bandwidth between a plurality of camera assemblies and an image processing system and/or reduces the number of electrical connections from the plurality of camera assemblies to the image processing system.

In one aspect of the present invention, a multicamera imaging-based bar code reader for imaging a target bar code on a target object is provided. In one exemplary embodiment, the reader features:

a housing supporting a plurality of transparent windows and defining an interior region, a target object being presented to the plurality of windows for imaging a target bar code;

an imaging system including a plurality of camera assemblies coupled to an image processing system, each camera assembly of the plurality of camera assemblies being positioned within the housing interior position and defining a field of view which is different than a field of view of each other camera assembly of the plurality of camera assemblies, each camera assembly including a sensor array and an imaging lens assembly for focusing the field of view of the camera assembly onto the sensor array;

for each camera assembly of the plurality of camera assemblies, the sensor array being read out at a predetermined frame rate to generate image frames of the field of view of the camera assembly at periodic intervals, the image frames being transmitted to the image processing system, a predetermined frame rate of at least one camera assembly of the plurality of camera assemblies being less than respective predetermined frame rates of others of the plurality of camera assemblies.

In one exemplary embodiment of the reader, the predetermined frame rates are determined based on positions of each camera assembly of the plurality of camera assemblies with respect to the plurality of windows such that those camera assemblies of the plurality of camera assemblies determined to be less likely to image a target bar code on a target object presented to the plurality of windows for imaging being assigned a lower predetermined frame rate.

In one exemplary embodiment of the reader, the image processing system determines the predetermined frame rate for each camera assembly based on a determination of a relative probability of each camera assembly of the plurality of camera assemblies imaging a decodable image of a target bar code when a target object is presented to the plurality of windows for imaging and wherein a camera assembly with a lower relative probability is assigned a lower predetermined frame rate.

In one exemplary embodiment of the reader, a number of data lines utilized for transmitting image frames from each camera assembly of the plurality of camera assemblies is proportional to a predetermined frame rate of the camera assembly.

In one aspect of the present invention, a method of operating a multicamera imaging-based bar code reader for imaging a target bar code on a target object is provided. In one exemplary embodiment, the steps of the method feature:

providing a multicamera imaging-based bar code reader including: a housing supporting a plurality of transparent windows and defining an interior region, a target object being presented to the plurality of windows for imaging a target bar code; an imaging system including a plurality of camera assemblies coupled to an image processing system, each camera assembly of the plurality of camera assemblies being positioned within the housing interior position and defining a field of view which is different than a field of view of each other camera assembly of the plurality of camera assemblies, each camera assembly including a sensor array and an imaging lens assembly for focusing the field of view of the camera assembly onto the sensor array;

operating the reader to image a target bar code on a target object, for each camera assembly of the plurality of camera assemblies, the sensor array being read out at a predetermined frame rate to generate image frames of the field of view of the camera assembly at periodic intervals, the image frames being transmitted to the image processing system, a predetermined frame rate of at least one camera assembly of the plurality of camera assemblies being less than respective predetermined frame rates of others of the plurality of camera assemblies.

In one exemplary embodiment of the method, the predetermined frame rates are determined based on positions of each camera assembly of the plurality of camera assemblies with respect to the plurality of windows such that those camera assemblies of the plurality of camera assemblies determined to be less likely to image a target bar code on a target object presented to the plurality of windows for imaging being assigned a lower predetermined frame rate.

In one exemplary embodiment of the method, the image processing system determines the predetermined frame rate for each camera assembly based on a determination of a relative probability of each camera assembly of the plurality of camera assemblies imaging a decodable image of a target bar code when a target object is presented to the plurality of windows for imaging and wherein a camera assembly with a lower relative probability is assigned a lower predetermined frame rate.

In one exemplary embodiment of the method, a number of data lines utilized for transmitting image frames from each camera assembly of the plurality of camera assemblies is proportional to a predetermined frame rate of the camera assembly.

These and other objects, advantages, and features of the exemplary embodiment of the invention are described in detail in conjunction with the accompanying drawings.

DETAILED DESCRIPTION

Figure 5:
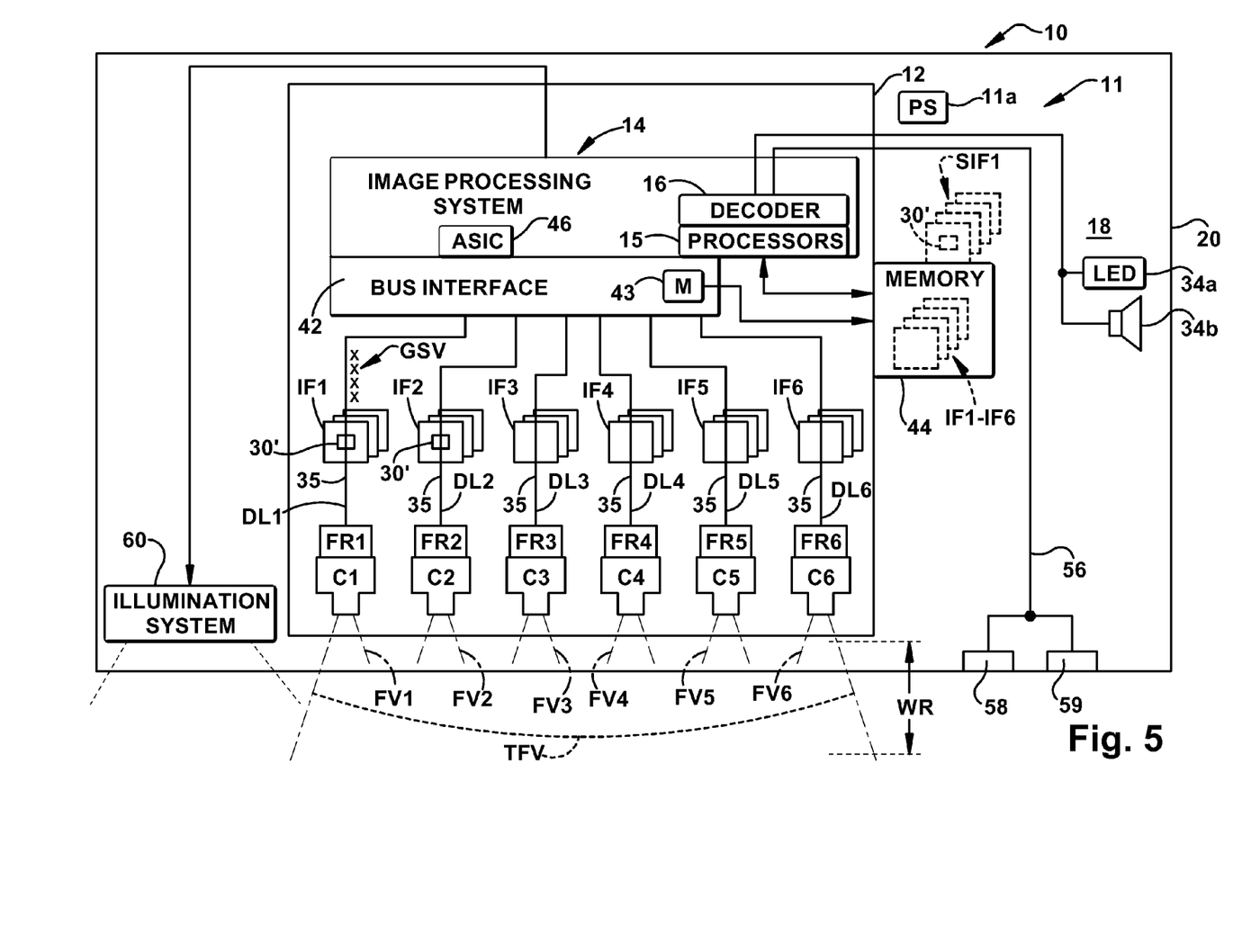
FIG. 5 is a schematic block diagram of selected systems and electrical circuitry of the bar code reader of FIG. 1.

An exemplary embodiment of a multicamera imaging-based bar code scanner or reader of the present invention is shown schematically at 10 in FIGS. 1-5. The bar code reader 10 includes circuitry 11 comprising an imaging system 12 which includes a plurality of imaging cameras C1, C2, C3, C4, C5, C6, which produce raw gray scale images, and an image processing system 14, which includes processors 15 and a decoder that analyze the gray scale images and decode imaged target bar codes, if present. The imaging system 12 is capable of reading, that is, imaging and decoding both 1D and 2D bar codes and postal codes. The reader 10 is also capable of capturing images and signatures. The decoder 16 may be integrated into the image processing system 40 (as shown in FIG. 5) or may be a separate system, as would be understood by one of skill in the art.

Figure 1:
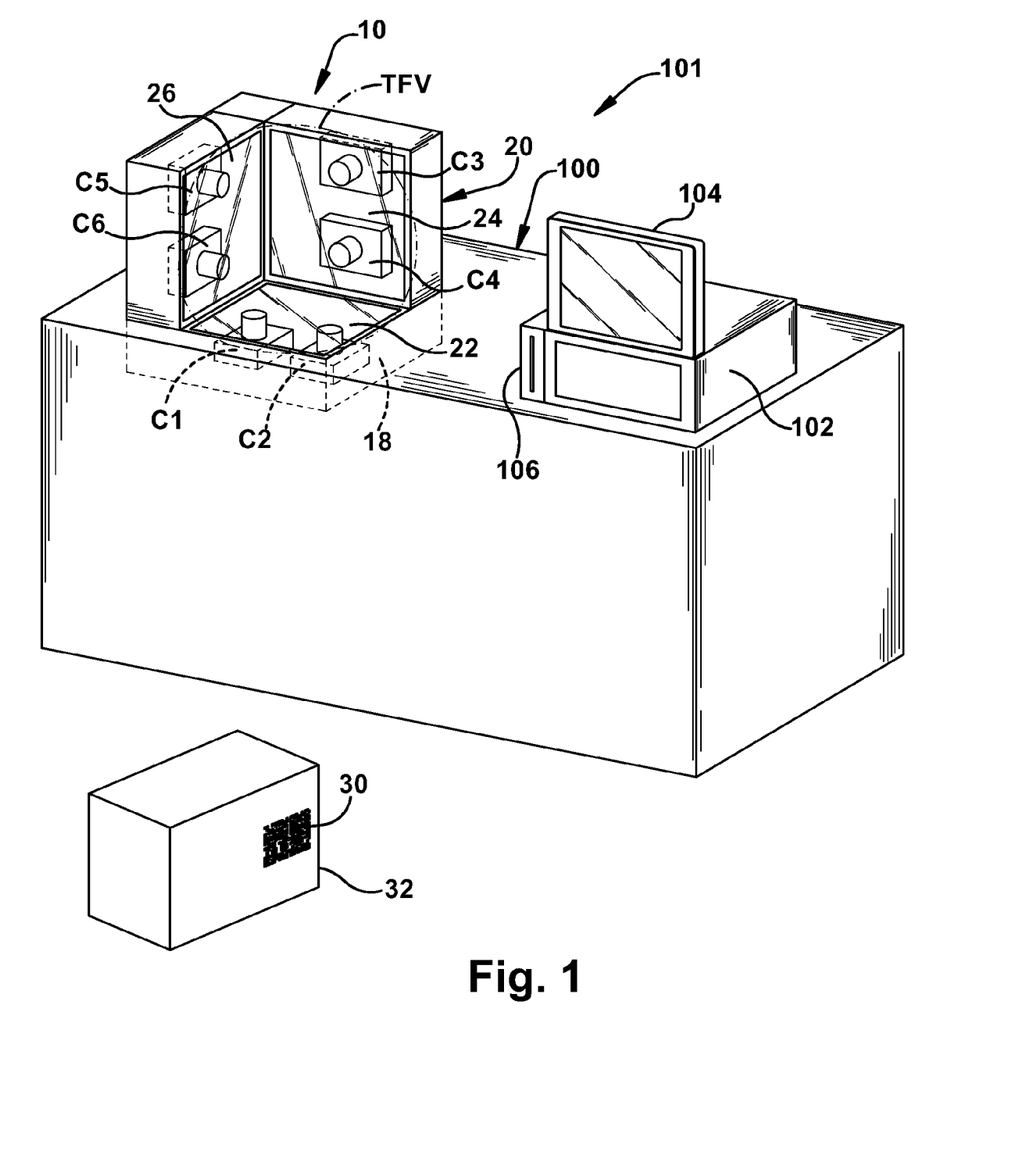
FIG. 1 is a schematic perspective view of an exemplary embodiment of an multicamera imaging-based bar code reader of the present invention as used in a point of sale counter.
Figure 2:
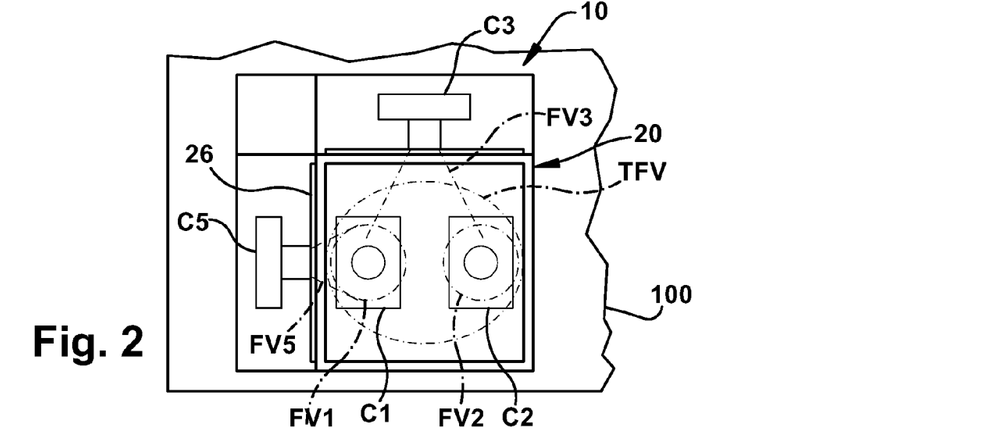
FIG. 2 is a schematic front elevation view of the bar code reader of FIG. 1.
Figure 3:
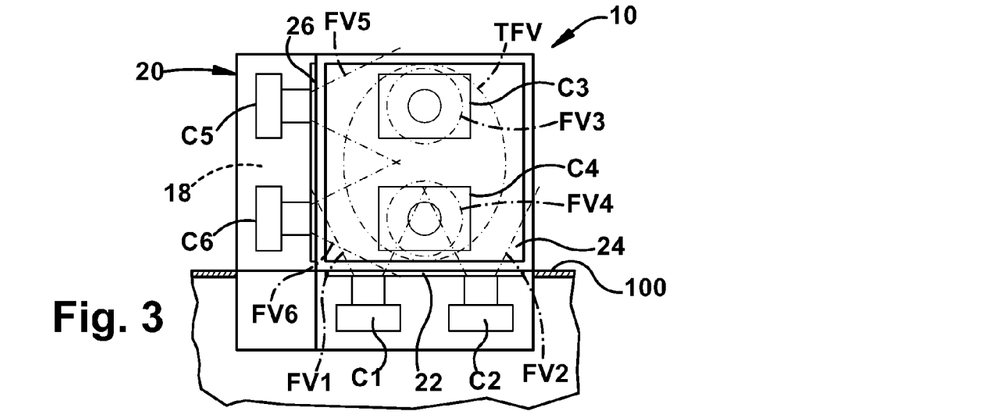
FIG. 3 is a schematic top plan view of the bar code reader of FIG. 1.
Figure 4:
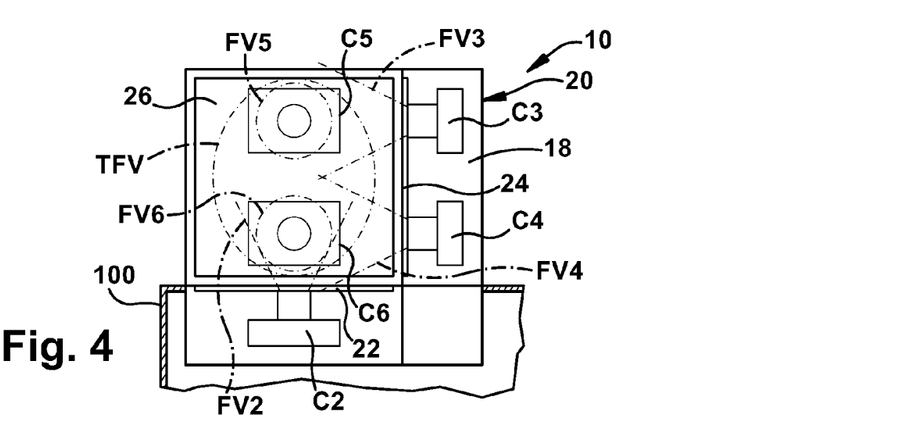
FIG. 4 is a schematic side elevation view of the bar code reader of FIG. 1.

In one exemplary embodiment, the reader 10 is stationary and reader systems and circuitry are supported within an interior region 18 of a housing 20. As best seen in FIG. 1, the housing 20 may be integrated into a sales counter 100 that of a point of sales system 101 that includes, for example, a cash register 102, a touch screen visual display 104 or other type user interface and a printer 106 for generating sales receipts. The housing 20 includes a plurality of transparent windows 22, 24, 26.

Positioned within the interior region 18 of the housing 20 are the plurality of camera assemblies C1-C6. The camera assemblies C1-C6 each define a two dimensional field of view FV1, FV2, FV3, FV4, FV5, FV6 and are positioned behind and adjacent to the windows 22, 24, 26 such that the respective fields of view FV1-FV6 pass from the housing 20 through the windows 22, 24, 26 creating an effective total field of view TFV for the reader 10 to the front of the windows 22, 24, 26, that is, outside the housing 20. Because each camera assembly C1-C6 has an effective working range WR (shown schematically in FIG. 5) over which a target bar code 30 may be successfully imaged and decoded, there is an effective target area TA (shown schematically in FIG. 1) to the front of the windows 24, 26, 28 within which a target bar code 30 presented for reading may be successfully imaged and decoded.

It should be understood that the present invention not limited to a housing 20 having three windows 24, 26, 28 or to an imaging system having six camera assemblies C1-C6, the reader 10 of the present invention may be modified and is equally applicable to, for example a housing having one, two or four windows and an imaging system having two, three, four, five, seven, eight or more camera assemblies.

Depending on the design and function of the point of sales counter 100, either a sales person or a customer will present a product or target object 32 selected for purchase to the housing 20. More particularly, a target bar code 30 imprinted or affixed to the target object 32 will be presented to one or more of the windows 22, 24, 26 of the housing 20 for reading, that is, imaging and decoding of the coded indicia of the target bar code 32. Upon a successful reading of the target bar code, a visual and/or audible signal will be generated by the reader 10 to indicate to the user that the target bar code 30 has been successfully imaged and decoded. The successful read indication may be in the form of illumination of a light emitting diode (LED) 34*a* (FIG. 5) and/or generation of an audible sound by a speaker 34*b* upon appropriate signal from the decoding circuitry 16.

Generally, upon repetitive use of the reader 10, a user (sales person or customer) will intuitively orient and move the target object 32 toward the windows 22, 24, 26 in such a way that the target bar code 30 is presented to a given window and even a particular region of a window in the same way and same orientation time after time. For example, a typical user may orient the target object 32 such that the target bar code 30 is facing the window 24 and is approximately centered with respect to the window 24. Thus, for this particular user, it would likely be the case that the target bar code 30 would be suitably imaged for decoding purposes generally by either the camera assembly C3 or the camera assembly C4 which are positioned behind vertical window 24.

By "suitably imaged for decoding purposes", it is meant that a specific camera assembly generates one or more image frames that includes an image 30' (shown schematically in FIG. 5) of the target bar code 30 and that image frame or those image frames are searched or analyzed by the image processor 15 for the imaged bar code 30 and, if present, the decoder 16 attempts to decode the encoded indicia of the imaged bar code 30'. Stated another way, a suitable image frame is one that includes the imaged bar code 30' and, either alone or in combination with other image frames, has sufficient resolution and is sufficiently complete to allow the decoding system 14 to decode the captured image 30' of the target bar code 30.

Each camera assembly C1-C6 of the imaging system 12 is adapted to capture a series of image frames of its respective field of view FV1-FV6. The series of image frames for each camera assembly C1-C6 is shown schematically as IF1, IF2, IF3, IF4, IF5, IF6 in FIG. 5. Each series of image frames IF1-IF6 comprises a sequence of individual image frames generated by the respective cameras C1-C6. As is conventional with imaging cameras, the image frames IF1-IF6 are in the form of respective digital signals representative of raw gray scale values generated by each of the camera assembly C1-C6.

Each camera C1-C6 is characterized by a frame rate FR1, FR2, FR3, FR4, FR5, FR6 (shown schematically in FIG. 5), which is a measure of how many image frames per second are read out from a given camera assembly. The frame rate of a particular camera is dependent on the exposure period and the time between successive read outs of a sensor array 36 of that camera.

The image processing system 40 controls operation of the cameras C1-C6. The cameras C1-C6, when operated during an imaging system, generate digital signals 35. The signals 35 are raw, digitized gray scale values which correspond to a series of generated image frames for each camera. For example, for the camera C1, the signal 35 corresponds to digitized gray scale values corresponding to a series of image frames IF1, for the camera C2, the signal 35 corresponds to digitized gray scale values corresponding to a series of image frame IF2, and so on. The digital signals 35 are coupled to a bus interface 42, where the signals are multiplexed by a multiplexer 43 and then communicated to a memory 44. The image processors 15 access the image frames IF1-IF6 from memory 44 and search for image frames that include the imaged target bar code 30'. If the imaged target bar code 30' is present and decodable in one or more image frames, the decoder 16 attempts to decode the imaged target bar code 30' using one or more of the image frames having the imaged target bar code 30' or a portion thereof.

In the present invention, the frame rates FR1-FR6 of each of the cameras C1-C6 may be changed by the imaging processing system 40 such that not all cameras operate at the same frame rate, e.g., 60 frames per second. Rather, depending on an analysis of which cameras of the set of cameras C1-C6 are more or less likely to produce a suitable image for decoding, the camera frame rates are adjusted such that those cameras that have a greater likelihood of generating a suitable image for decoding are assigned a higher frame rate (higher predetermined frame rate, e.g., 60 frames/sec) and those cameras that have a lesser likelihood of generating a suitable image for decoding are assigned a lower frame rate (lower predetermined frame rate, e.g., 30 frames/sec). For simplicity, cameras with a lower likelihood of generating suitable images are referred to as less utilized or lower frame rate cameras and cameras with a higher likelihood of generating suitable images for decoding are referred to as greater utilized or higher frame rate cameras.

It should be understood, of course, that for any individual presentation of a target bar code 30 to the reader windows 22, 24, 26, the exact orientation and manner of presentation of the target bar code 30 to the windows will determine which camera or cameras generate suitable images for decoding. However, based on human repetitive behavior, it is likely that, for example, sales persons generally or a given sales person, specifically, will develop a pattern of presentation of a target bar code 30 to the windows 22, 24, 26 that results in certain cameras having a much higher probability of generating an image frame that includes the imaged target bar code 30' and is suitable for decoding the imaged bar code 30', either alone or in conjunction with other image frames. The present invention capitalizes on the repetitive nature of human beings to suitably adjust camera frame rates and, specifically, scaling back or reducing frame rates for less utilized/low frame rate cameras.

The method of operation of the present invention advantageously reduces the bandwidth requirement of a communications interface bus 42 that provides the interface between the imaging processing system 40 and the cameras C1-C6. For example, the reader 10 in an exemplary embodiment is a six camera system C1-C6. If the imaging system 12 is running at 26 MHz, a frame rate of 60 frames/sec and a sensor size of 752×480, this requires a throughput of 156 Mbytes/sec. If, using the operating method of the present invention, for example, three less utilized cameras are operated at 30 frames per second and three more utilized cameras are operated at 60 frames per second, the throughput drops by 25% from 156 Mbytes/sec to 117 Mbytes/sec, a significant reduction in bandwidth.

Figure 6:
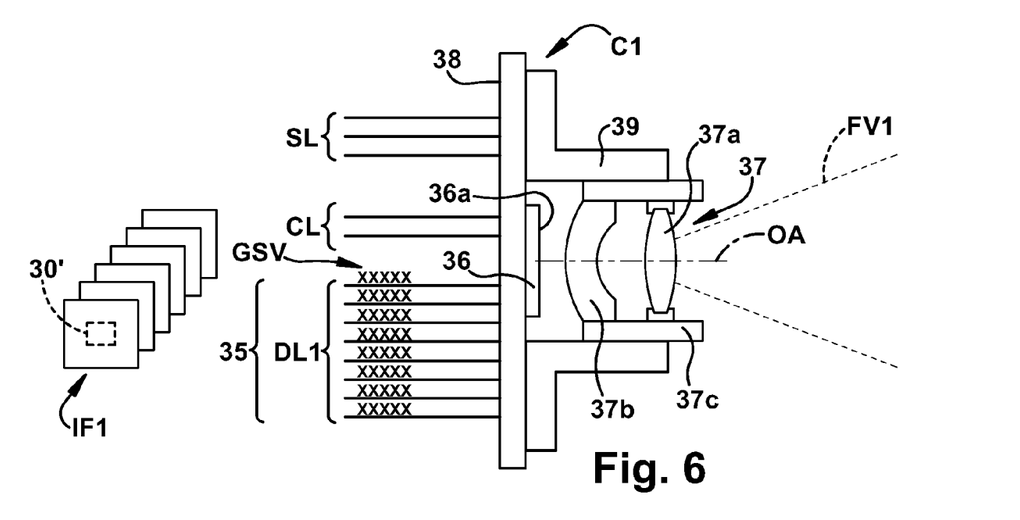
FIG. 6 is a schematic side elevation view of a camera assembly of the bar code reader of FIG. 1.

The method of operation of the present invention further advantageously allows a reduction in the number of data lines used in conjunction with less utilized/lower frame rate cameras. The image frames IF1-IF6 of the cameras C1-C6 are communicated along data lines DL1-DL6 of the respective cameras C1-C5 to the bus interface 42 of the image processing system 40. Typically, as is best seen in FIG. 6, each camera C1-C6 includes two control lines CL, three synchronization lines SL and eight data lines DL which transmit the digital raw gray scale data signals 35 generated by the camera representative of the image frames, e.g., camera C1 generates image frames IF1 which are transmitted as digital signals 35 on data lines DL1. It has been found that for low frame rate cameras, the number of data lines DL actually utilized may be significantly reduced to six or less, thereby reducing the cost of the application specific integrated circuit ASIC 46 implements and control the interface bus 42 between the camera systems C1-C6 and the image processing system 40.

A representative camera assembly C1 is shown in FIG. 6, but it should be understood that the following discussion applies to all of the camera assemblies C1-C6. The camera assembly C1 includes the sensor array 36 and an imaging lens assembly 37, both of which are secured to a substrate such as a printed circuit board 38. The imaging lens assembly 37 includes one or more focusing lens 37a, 37b supported in a lens holder 37c. A shroud 39 is affixed to the printed circuit board 38 to prevent ambient illumination from reaching the sensor array 36. The imaging lens assembly 37 focuses light from the camera field of view FV1 onto a light receiving surface 36a of the sensor array 36. Thus, assuming the target bar code 30 is within the field of view FV1 and within the working range WR of the camera, the imaging lens assembly 37 focuses an image of the target bar code 30 onto the array of photosensors/pixels comprising the sensor array 36.

The sensor array 36 comprises a charged coupled device (CCD), a complementary metal oxide semiconductor (CMOS), or other imaging pixel array, operating under the control of the imaging processing system 40. In one exemplary embodiment, the sensor array 36 comprises a two dimensional (2D) CMOS array with a typical size of the pixel array being on the order of 752×480 pixels. The illumination-receiving pixels of the sensor array 36 define the sensor array surface 36a (best seen in FIG. 6). The sensor array 36 is secured to the printed circuit board 38, in parallel direction for stability. The sensor array surface 36a is substantially perpendicular to an optical axis OA of the imaging lens assembly 37, that is, a z axis that is perpendicular to the sensor array surface 36a would be substantially parallel to the optical axis OA of the focusing lens. The pixels of the sensor array surface 36a are disposed in an orthogonal arrangement of rows and columns of pixels.

The reader circuitry 11 includes imaging system 12, the memory 44 and a power supply 11a. The power supply 11a is electrically coupled to and provides power to the circuitry 11 of the reader. Optionally, the reader 10 may include an illumination system 60 (shown schematically in FIG. 5) which provides illumination to illuminate the effective target area TA to facilitate obtaining an image 30' of a target bar code 30 that has sufficient resolution and clarity for decoding.

The bar code reader circuitry 11, including the imaging system 12, the image processing system 14 and the decoder 16 of the present invention, may be embodied in hardware, software, firmware or electrical circuitry or any combination thereof. Moreover, portions of the circuitry 11 may be resident in the housing 20 or may be located external to the housing 20, for example, in a PC that operates the other components, such as the cash register 102, display 104, and printer 206 of the point of sale system 101.

For each camera assembly C1-C6, the sensor array 28 is enabled during an exposure period to capture an image of the field of view FV1-FV6 of the camera assembly. The field of view F1-FV6 is a function of both the configuration of the sensor array 36 and the optical characteristics of the imaging lens assembly 37 and the distance and orientation between the array 36 and the lens assembly 37.

If the target bar code 30 is within the field of view of a particular camera assembly, say camera C1, each image frame of the series of image frames IF1 includes an image 30' of the target bar code 30 (shown schematically in FIG. 5). The image processors 15 and the decoding system 14 select an image frame from the series of image frames IF1-IR6 stored in the memory 44 and attempt to locate and decode a digitized, gray scale version of the image bar code 30'.

The camera assemblies C1-C6 are continuously generating respective series of image frames IF1-IF6. Since most of these captured frames IF1-IF6 will not include an imaged target bar code 30', the image processors 15 of the image processing system 14 must analyze the stored image frames IF1-IF6 in memory 44 to find a subset (shown schematically as SIF1 in FIG. 5) of the series of image frames IF1-IF6 (for example, five frames SIF1 from the series of image frame IF1) that include the imaged bar code 30'. The selected image frame subset SIF1 of IF1 is then subject to attempted decoding by the decoder 16.

For each camera assembly C1-C6, electrical signals are generated by reading out of some or all of the pixels of the pixel array 36 after an exposure period generating the gray scale value digital signal 35 (FIGS. 5 & 6). This occurs as follows: within each camera, the light receiving photosensor/ pixels of the sensor array 36 are charged during an exposure period. Upon reading out of the pixels of the sensor array 36, an analog voltage signal is generated whose magnitude corresponds to the charge of each pixel read out. The image signals 35 of each camera assembly C1-C6 represents a sequence of photosensor voltage values, the magnitude of each value representing an intensity of the reflected light received by a photosensor/pixel during an exposure period.

Processing circuitry of the camera assembly, including gain and digitizing circuitry, then digitizes and coverts the analog signal into a digital signal whose magnitude corresponds to raw gray scale values (schematically shown as GSV in FIGS. 5 and 6) of the pixels. The series of gray scale values GSV represent successive image frames generated by the camera assembly, for example, in FIG. 6 the gray scale values GSV represent gray scale values for image frames IF1 for camera assembly C1. The digitized signal 35 comprises a sequence of digital gray scale values GSV typically ranging from 0-255 (for an eight bit A/D converter, i.e., $2^8=256$), where a 0 gray scale value would represent an absence of any reflected light received by a pixel during an exposure or integration period (characterized as low pixel brightness) and a 255 gray scale value would represent a very intense level of reflected light received by a pixel during an exposure period (characterized as high pixel brightness). In some sensors, particularly CMOS sensors, all pixels of the pixel array 36 are not exposed at the same time, thus, reading out of some pixels may coincide in time with an exposure period for some other pixels.

As is best seen in FIG. 5, the digital signals 35 are received by the bus interface 42 of the image processing system 40, which may include the multiplexer 43, operating under the control of the ASIC 46, to serialize the image data contained in the digital signals 35. The digitized gray scale values GSV of the digitized signal 35 are stored in the memory 44. The digital values GSV constitute a digitized gray scale version of the series of image frames IF1-IF6, which for each camera assembly C1-C6 and for each image frame is representative of the image projected by the imaging lens assembly 37 onto the pixel array 36 during an exposure period. If the field of view of the imaging lens assembly 37 includes the target bar code 30, then a digital gray scale value image 30' of the target bar code 30 would be present in the digitized image frame (for example frames SIF1.

The decoding circuitry 14 then operates on the selected image frames SIF1 and attempts to decode any decodable image within the image frames, e.g., the imaged target bar code 30'. If the decoding is successful, decoded data 56, representative of the data/information coded in the target bar code 30 is then output via a data output port 58 and/or displayed to a user of the reader 10 via a display 59. Upon achieving a good read of the target bar code 30, that is, the bar code 30 was successfully imaged and decoded, the speaker 34b and/or an indicator LED 34a is activated by the bar code reader circuitry 11 to indicate to the user that the target bar code 30 has successfully read.

Determination of Frame Rates FR1-FR6

As noted above, the present invention recognizes that when using a plurality of camera assemblies in an imaging-based reader, because of human repetitive behavior and preferences in presenting target bar codes 30 to the reader windows 22, 24, 26, certain camera assembly or camera assemblies of the plurality of camera assemblies C1-C6 will be less utilized, that is, less likely to generate a decodable image 30' of the target bar code 30 than other of the camera assemblies. Therefore, the present invention contemplates that these "less utilized" camera assemblies will be assigned lower frame rates by the image processing system 40 than "more utilized" camera assemblies, that is, camera assemblies more likely to generate a decodable image 30' of the target bar code 30. One of skill in the art would understand that there are a number of ways to determine or assign frame rate for individual camera assemblies and it is the intent of the present invention to cover all ways that would be so understood.

It should also be understood that in assigning predetermined "lower frame rates" and "higher frame rates" to camera assemblies C1-C6, there are many methods that may be used. For example, a simple method would be to simply have a two state system with cameras classified as "less utilized" assigned a predetermined first frame rate (e.g., 30 frames/sec) and cameras classified as "more utilized" assigned a predetermined second frame rate (e.g., 60 frames/sec). Another method of assigning frame rates would be to have a proportional assignment or utilize a look up table that has a functional relationship between utilization and frame rate. Such a method, for example, would utilize a look up table wherein if a relative measure of utilization of a camera assembly is determined to be X, then, from the table, the assigned predetermined frame rate is Y.

The frame rates FR1-FR6 for the cameras C1-C6 may be determined by a designer of the reader 10 and input to the imaging system 12 or may be determined by the image processing system 40 of the reader imaging system 12 based on data gathered during one or more bar code reading sessions, where the reader 10 is used to image and decode a plurality of target bar codes 30. The predetermined frame rates FR1-FR6 may be set once or may be updated either continuously or periodically by the image processing system 40.

Figure 7:
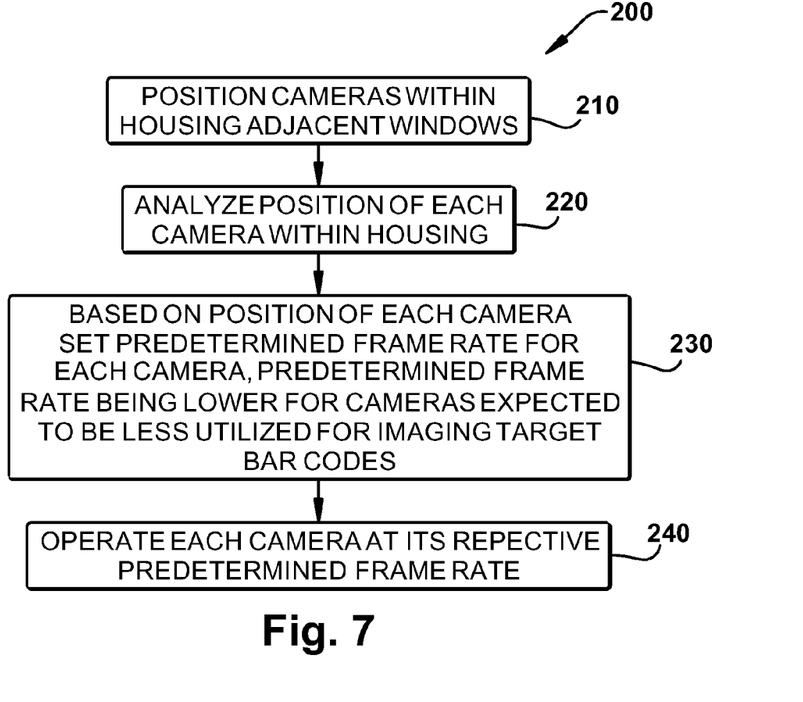
FIG. 7 is a schematic flow chart of a first method of determining frame rates for each of a plurality of cameras of the bar code reader of FIG. 1.
Figure 8:
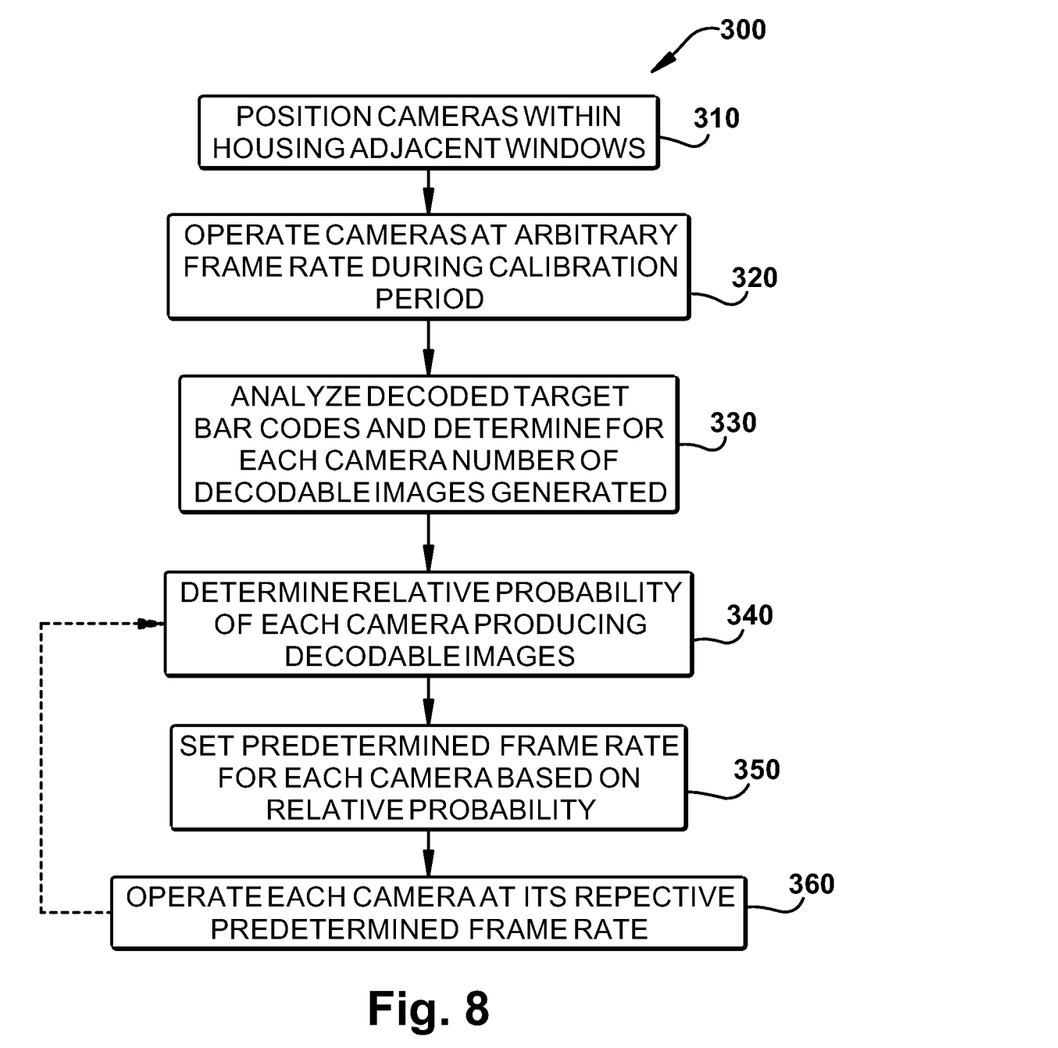
FIG. 8 is a schematic flow chart of a second method of determining frame rates for each of a plurality of cameras of the bar code reader of FIG. 1.

Two exemplary methods of operation of the reader 10 or methods of assigning frame rates to individual camera assemblies C1-C6 are set forth in FIGS. 7 and 8.

The method of operation of FIG. 7 is shown generally at 200. At step 210, the camera assemblies C1-C6 are positioned in the housing 20 as desired adjacent the windows 22, 24, 26. At step 220, the position of each camera assembly C1-C6 is analyzed in terms of likelihood that a camera in the particular position would have a greater or smaller likelihood of imaging a target bar code 30' vis-à-vis the other camera assemblies. This analysis may be based on empirical evidence and/or experience with similar readers in similar point of sale situations and would normally be performed by designers of the reader 10.

At step 230, based on the position of each camera assembly C1-C6, a predetermined frame rate FR1-FR6 would be set for each camera assembly C1-C6, with the predetermined frame rate being lower for those camera assembly or assemblies expected to be relatively less utilized for imaging target bar codes and the predetermined frame rate being higher for those camera assembly or assemblies expected to be relatively more utilized for imaging target bar codes. At step 240, after a predetermined frame rates FR1-FR6 are determined for each camera assembly C1-C6, the information is provided to the image processing system 40 and the camera assemblies C1-C6 are operated during an imaging session at their respective predetermined frame rates FR1-FR6.

It should be understood, that different frame rates may be provided to the image processing system based on different expected users, size of expected target objects 32 being scanned, etc. For example, predetermined frame rates FR1-FR6 may change by shift or sales person, e.g., sales person A may prefer using horizontal window 22 for scanning, while sales person B may prefer using vertical window 24 for scanning, thus, the predetermined frame rates FR1-FR6 may change as a function of sales person. In this example, if sales person A were logged into the point of sales system 101 and/or the reader 10, the frame rate FR1 & FR2 for cameras C1 & C2 (cameras behind window 22) would be set at, for example, 60 frames/sec, while the frame rates for the remaining cameras C3, C4, C5 & C6 would be set at, 40 or 30 or some lower number of frames/sec. By contrast, if sales person B were logged into the point of sales system 101, the frame rate FR3 & FR4 for cameras C3 & C4 (cameras behind window 24) would be set at, for example, 60 frames/sec, while the frame rate for the remaining cameras C1, C2, C5 & C6 would be set at, 40 or 30 or some lower number of frames/sec.

The exemplary method of operation set forth in FIG. 8 at 300 is a more dynamic method wherein the image processing system 40 dynamically analyzes the frame rates FR1-FR6 and makes changes to the frame rates based on which camera assemblies C1-C6 are experiencing higher versus lower utilization rates.

At step 310, the camera assemblies C1-C6 are positioned in the housing 20 as desired adjacent the windows 22, 24, 26. At step 320, the camera assemblies C1-C6 are operated during a calibration period at an arbitrary frame rate (say 60 frames/sec) as the reader 10 is used to read typical target bar codes by an experienced, typical user or sales person.

At step 330, the results of the calibration period are analyzed by the image processing system 40 to see which camera assemblies C1-C6 generated images that were used by the decoding system 14 to decode the target bar codes 30. Essentially, an analysis is made of the number of decodable images generated by each of the camera assemblies C1-C6. At step 340, a determination of the relative measure or probability of each camera assembly C1-C6 producing or generating a decodable image, that is, an image frame that includes an image 30' of a target bar code 30 that is suitable for decoding either alone or in combination with other image frames, is made by the image processing system 40.

At step 350, based on the relative probabilities determined in step 340, a predetermined frame rate FR1-FR6 would be set for each camera assembly C1-C6, with the predetermined frame rate being lower for those camera assembly or assemblies expected to be less utilized for imaging target bar codes and the predetermined frame rate being higher for those camera assembly or assemblies expected to be more utilized for imaging target bar codes. For example, a look up table may be provided to the image processing system 40 to map the relative probability numbers to specific frame rates.

At step 360, after a predetermined frame rates FR1-FR6 are determined for each camera assembly C1-C6, the information is provided to the image processing system 40 and the camera assemblies C1-C6 are operated during an imaging session at their respective predetermined frame rates FR1-FR6.

As can be seen from the dashed arrow between steps 360 and 340, it is expected that periodically or continuously, the image processing system 40 will utilize information gathered during the course of ongoing imaging sessions to update the relative probabilities for each camera assembly C1-C6 and, thereby, dynamically change predetermined frame rates FR1-FR6 in light of changes experienced during operation of the reader 10.

Alternatively, it is possible to operate the cameras C1-C6 at arbitrary frame rates FR1-FR6 in order to satisfy the bandwidth requirements or limitations of a particular imaging system design.

With respect to the number of data lines DL1-DL6 used for each camera assembly, it is understood that the lower the frame rate for a camera assembly, the lower the number of data lines required for transmission of the digital image frame signal 35 for that camera. Thus, the image processing system 40 may also adjust the number of data lines utilized by each camera assembly in proportion to the respective frame rate of each camera assembly.

While the present invention has been described with a degree of particularity, it is the intent that the invention includes all modifications and alterations from the disclosed design falling within the spirit or scope of the appended claims.

We claim:

1. A multicamera imaging-based bar code reader for imaging a target bar code on a target object, the bar code reader comprising:

a housing supporting a plurality of transparent windows and defining an interior region, a target object being presented to the plurality of windows for imaging a target bar code;

an imaging system including a plurality of camera assemblies coupled to an image processing system, each camera assembly of the plurality of camera assemblies being positioned within the housing interior position and defining a field of view which is different than a field of view of each other camera assembly of the plurality of camera assemblies, each camera assembly including a sensor array and an imaging lens assembly for focusing the field of view of the camera assembly onto the sensor array; and for each camera assembly of the plurality of camera assemblies, the sensor array being read out at a predetermined frame rate to generate image frames of the field of view of the camera assembly at periodic intervals, the image frames being transmitted to the image processing system, a predetermined frame rate of at least one camera assembly of the plurality of camera assemblies being less than respective predetermined frame rates of others of the plurality of camera assemblies; and wherein the predetermined frame rates are determined based on positions of each camera assembly of the plurality of camera assemblies with respect to the plurality of windows such that those camera assemblies of the plurality of windows determined to be less likely to image a target bar code on a target object presented to the plurality of windows for imaging being assigned a lower predetermined frame rate.

2. The bar code reader of claim 1 wherein the image processing system determines the predetermined frame rate for each camera assembly based on a determination of a relative probability of each camera assembly of the plurality of camera assemblies imaging a decodable image of a target bar code on a target object presented to the plurality of windows for imaging, wherein a camera assembly with a lower relative probability is assigned a lower predetermined frame rate.

3. The bar code reader of claim 1 wherein a number of data lines utilized for transmitting image frames from each camera assembly of the plurality of camera assemblies is proportional to a predetermined frame rate of the camera assembly.

4. The bar code reader of claim 1 wherein the housing is integrated into a point of sale counter.

5. The bar code reader of claim 1 wherein the plurality of windows includes at least one vertically oriented window and one horizontally oriented window.

6. A method of operating a multicamera imaging-based bar code reader for imaging a target bar code on a target object, the steps of the method comprising:

providing a multicamera imaging-based bar code reader including: a housing supporting a plurality of transparent windows and defining an interior region, a target object being presented to the plurality of windows for imaging a target bar code;

an imaging system including a plurality of camera assemblies coupled to an image processing system, each camera assembly of the plurality of camera assemblies being positioned within the housing interior position and defining a field of view which is different than a field of view of each other camera assembly of the plurality of camera assemblies, each camera assembly including a sensor array and an imaging lens assembly for focusing the field of view of the camera assembly onto the sensor array;

operating the reader to image a target bar code on a target object, for each camera assembly of the plurality of camera assemblies, the sensor array being read out at a predetermined frame rate to generate image frames of the field of view of the camera assembly at periodic intervals, the image frames being transmitted to the image processing system, a predetermined frame rate of at least one camera assembly of the plurality of camera assemblies being less than respective predetermined frame rates of others of the plurality of camera assemblies; and wherein the predetermined frame rates are determined based on positions of each camera assembly of the plurality of camera assemblies with respect to the plurality of windows such that those camera assemblies of the plurality of windows determined to be less likely to image a target bar code on a target object presented to the plurality of windows for imaging being assigned a lower predetermined frame rate.

7. The method of claim 6 wherein the image processing system determines the predetermined frame rate for each camera assembly based on a determination of a relative probability of each camera assembly of the plurality of camera assemblies imaging a decodable image of a target bar code when a target object is presented to the plurality of windows for imaging and wherein a camera assembly with a lower relative probability is assigned a lower predetermined frame rate.

8. The method of claim 6 wherein a number of data lines utilized for transmitting image frames from each camera assembly of the plurality of camera assemblies is proportional to a predetermined frame rate of the camera assembly.

9. An imaging system for use in multicamera imaging-based bar code reader having a housing supporting a plurality of transparent windows and defining an interior region, a target object being presented to the plurality of windows for imaging a target bar code on a target object, the imaging system comprising:

a plurality of camera assemblies coupled to an image processing system, each camera assembly of the plurality of camera assemblies being positioned within the housing interior position and defining a field of view which is different than a field of view of each other camera assembly of the plurality of camera assemblies, each camera assembly including a sensor array and an imaging lens assembly for focusing the field of view of the camera assembly onto the sensor array; and for each camera assembly of the plurality of camera assemblies, the sensor array being read out at a predetermined frame rate to generate image frames of the field of view of the camera assembly at periodic intervals, the image frames being transmitted to the image processing system, a predetermined frame rate of at least one camera assembly of the plurality of camera assemblies being less than respective predetermined frame rates of others of the plurality of camera assemblies; and wherein the predetermined frame rates are determined based on positions of each camera assembly of the plurality of camera assemblies with respect to the plurality of windows such that those camera assemblies of the plurality of windows determined to be less likely to image a target bar code on a target object presented to the plurality of windows for imaging being assigned a lower predetermined frame rate.

10. The imaging system of claim 9 wherein the image processing system determines the predetermined frame rate for each camera assembly based on a determination of a relative probability of each camera assembly of the plurality of camera assemblies imaging a decodable image of a target bar code on a target object presented to the plurality of windows for imaging, wherein a camera assembly with a lower relative probability is assigned a lower predetermined frame rate.

11. The imaging system of claim 9 wherein a number of data lines utilized for transmitting image frames from each camera assembly of the plurality of camera assemblies is proportional to a predetermined frame rate of the camera assembly.

12. A multicamera imaging-based bar code reader for imaging a target bar code on a target object, the bar code reader comprising:

a housing means supporting a plurality of transparent windows and defining an interior region, a target object being presented to the plurality of windows for imaging a target bar code;

an imaging system means including a plurality of camera assembly means coupled to an image processing system means, each camera assembly means of the plurality of camera assembly means being positioned within the housing interior position and defining a field of view which is different than a field of view of each other camera assembly means of the plurality of camera assembly means, each camera assembly means including a sensor array and an imaging lens assembly for focusing the field of view of the camera assembly means onto the sensor array; and for each camera assembly means of the plurality of camera assembly means, the sensor array being read out at a predetermined frame rate to generate image frames of the field of view of the camera assembly means at periodic intervals, the image frames being transmitted to the image processing system means, a predetermined frame rate of at least one camera assembly means of the plurality of camera assembly means being less than respective predetermined frame rates of others of the plurality of camera assembly means; and wherein the predetermined frame rates are determined based on positions of each camera assembly of the plurality of camera assemblies with respect to the plurality of windows such that those camera assemblies of the plurality of windows determined to be less likely to image a target bar code on a target object presented to the plurality of windows for imaging being assigned a lower predetermined frame rate.

13. The bar code reader of claim 12 wherein the image processing system means determines the predetermined frame rate for each camera assembly means based on a determination of a relative probability of each camera assembly means of the plurality of camera assembly means imaging a decodable image of a target bar code on a target object presented to the plurality of windows for imaging, wherein a camera assembly means with a lower relative probability is assigned a lower predetermined frame rate.

14. The bar code reader of claim 12 wherein a number of data lines utilized for transmitting image frames from each camera assembly means of the plurality of camera assembly means is proportional to the predetermined frame rate of the camera assembly means.

* * * * *